(12) United States Patent
Birmingham (10) Patent No.: US 7,979,095 B2
(45) Date of Patent: Jul. 12, 2011

(54) WIRELESS IN-BAND SIGNALING WITH IN-VEHICLE SYSTEMS

(75) Inventor: Kiley Birmingham, Seattle, WA (US)

(73) Assignee: Airbiquity, Inc., Seattle, WA (US)

( * ) Notice: Subject to any disclaimer, the term of this patent is extended or adjusted under 35 U.S.C. 154(b) by 317 days.

(21) Appl. No.: 12/254,793

(22) Filed: Oct. 20, 2008

(65) Prior Publication Data

US 2009/0117947 A1    May 7, 2009

Related U.S. Application Data

(60) Provisional application No. 60/981,487, filed on Oct. 20, 2007.

(51) Int. Cl.
  *H04M 1/00* (2006.01)
(52) U.S. Cl. ............... 455/569.2; 455/414.1; 455/404.1; 455/518; 455/557; 455/456.1
(58) Field of Classification Search ............... 455/569.2, 455/518, 557, 404.1, 414.1, 456.1; 379/52
  See application file for complete search history.

(56) References Cited

U.S. PATENT DOCUMENTS

| | | |
|---|---|---|
| 3,742,197 A | 6/1973 | Pommerening |
| 3,742,463 A | 6/1973 | Haselwood |
| 3,971,888 A | 7/1976 | Ching |
| 3,984,814 A | 10/1976 | Bailey, Jr. |
| 3,985,965 A | 10/1976 | Field |
| 4,158,748 A | 6/1979 | En |
| 4,218,654 A | 8/1980 | Ogawa |
| 4,310,722 A | 1/1982 | Schaible |
| 4,355,310 A | 10/1982 | Belaigues |
| 4,368,987 A | 1/1983 | Waters |
| 4,494,114 A | 1/1985 | Kaish |
| 4,494,211 A | 1/1985 | Schwartz |
| 4,539,557 A | 9/1985 | Redshaw |
| 4,577,343 A | 3/1986 | Oura |
| 4,595,950 A | 6/1986 | Lofberg |
| 4,598,272 A | 7/1986 | Cox |
| 4,599,583 A | 7/1986 | Shimozono |
| 4,607,257 A | 8/1986 | Noguchi |
| 4,630,301 A | 12/1986 | Hohl |
| 4,641,323 A | 2/1987 | Tsang |
| 4,651,157 A | 3/1987 | Gray |

(Continued)

FOREIGN PATENT DOCUMENTS

CA          2242495         1/2000

(Continued)

OTHER PUBLICATIONS

USPTO Search Authority; PCT/US08/80555 International Search Report; Dec. 19, 2008, 11 Pages.

(Continued)

*Primary Examiner* — Charles N. Appiah
*Assistant Examiner* — Michael T Vu
(74) *Attorney, Agent, or Firm* — Stolowitz Ford Cowger LLP (57) ABSTRACT

This invention pertains to methods and apparatus for data communications from vehicles, to obtain emergency, concierge and other services, using a voice channel of a digital wireless telecommunications network. Signaling is described for commencing data sessions after establishing a voice channel call. The call may be initiated from the vehicle automatically, and the call taker location may be unattended. Signaling methods are selected for traversing both newer and legacy vocoders for ubiquitous operation.

20 Claims, 5 Drawing Sheets

U.S. PATENT DOCUMENTS

| | | |
|---|---|---|
| 4,656,463 A | 4/1987 | Anders |
| 4,675,656 A | 6/1987 | Narcisse |
| 4,685,131 A | 8/1987 | Horne |
| 4,750,197 A | 6/1988 | Denekamp |
| 4,754,255 A | 6/1988 | Sanders |
| 4,766,589 A | 8/1988 | Fisher |
| 4,776,003 A | 10/1988 | Harris |
| 4,831,647 A | 5/1989 | D'Avello |
| 4,860,336 A | 8/1989 | D'Avello |
| 4,914,651 A | 4/1990 | Lusignan |
| 4,918,425 A | 4/1990 | Greenberg |
| 4,918,717 A | 4/1990 | Bissonnette |
| 4,926,444 A | 5/1990 | Hamilton |
| 4,941,155 A | 7/1990 | Chuang |
| 4,965,821 A | 10/1990 | Bishop |
| 4,977,609 A | 12/1990 | McClure |
| 4,984,238 A | 1/1991 | Watanabe |
| 5,014,344 A | 5/1991 | Goldberg |
| 5,025,455 A | 6/1991 | Nguyen |
| 5,036,537 A | 7/1991 | Jeffers |
| 5,040,214 A | 8/1991 | Grossberg |
| 5,043,736 A | 8/1991 | Darnell |
| 5,081,667 A | 1/1992 | Drori |
| 5,095,307 A | 3/1992 | Shimura |
| 5,119,403 A | 6/1992 | Krishnan |
| 5,119,504 A | 6/1992 | Durboraw, III |
| 5,134,644 A | 7/1992 | Garton |
| 5,155,689 A | 10/1992 | Wortham |
| 5,191,611 A | 3/1993 | Lang |
| 5,201,071 A | 4/1993 | Webb |
| 5,203,012 A | 4/1993 | Patsiokas |
| 5,208,446 A | 5/1993 | Martinez |
| 5,212,831 A | 5/1993 | Chuang |
| 5,214,556 A | 5/1993 | Kilbel |
| 5,218,618 A | 6/1993 | Sagey |
| 5,223,844 A | 6/1993 | Mansell |
| 5,227,776 A | 7/1993 | Starefoss |
| 5,235,633 A | 8/1993 | Dennison |
| 5,245,634 A | 9/1993 | Averbuch |
| 5,245,647 A | 9/1993 | Grouffal |
| 5,272,747 A | 12/1993 | Meads |
| 5,282,204 A | 1/1994 | Shpancer |
| 5,289,372 A | 2/1994 | Guthrie |
| 5,301,353 A | 4/1994 | Borras |
| 5,301,359 A | 4/1994 | Van Den Heuvel |
| 5,305,384 A | 4/1994 | Ashby |
| 5,317,309 A | 5/1994 | Vercellotti |
| 5,331,635 A | 7/1994 | Ota |
| 5,333,175 A | 7/1994 | Ariyavisitakul |
| 5,334,974 A | 8/1994 | Simms |
| 5,347,272 A | 9/1994 | Ota |
| 5,363,375 A | 11/1994 | Chuang |
| 5,363,376 A | 11/1994 | Chuang |
| 5,365,450 A | 11/1994 | Schuchman |
| 5,365,577 A | 11/1994 | Davis |
| 5,379,224 A | 1/1995 | Brown |
| 5,381,129 A | 1/1995 | Boardman |
| 5,388,147 A | 2/1995 | Grimes |
| 5,388,247 A | 2/1995 | Goodwin |
| 5,389,934 A | 2/1995 | Kass |
| 5,390,216 A | 2/1995 | Bilitza |
| 5,396,539 A | 3/1995 | Slekys |
| 5,396,653 A | 3/1995 | Kivari |
| 5,408,684 A | 4/1995 | Yunoki |
| 5,410,541 A | 4/1995 | Hotto |
| 5,410,739 A | 4/1995 | Hart |
| 5,414,432 A | 5/1995 | Penny, Jr. |
| 5,418,537 A | 5/1995 | Bird |
| 5,420,592 A | 5/1995 | Johnson |
| 5,422,816 A | 6/1995 | Sprague |
| 5,428,636 A | 6/1995 | Meier |
| 5,438,337 A | 8/1995 | Aguado |
| 5,440,491 A | 8/1995 | Kawano |
| 5,448,622 A | 9/1995 | Huttunen |
| 5,450,130 A | 9/1995 | Foley |
| 5,459,469 A | 10/1995 | Schuchman |
| 5,461,390 A | 10/1995 | Hoshen |
| 5,475,864 A | 12/1995 | Hamabe |
| 5,475,868 A | 12/1995 | Duque-Anton |
| 5,479,480 A | 12/1995 | Scott |
| 5,479,482 A | 12/1995 | Grimes |
| 5,483,549 A | 1/1996 | Weinberg |
| 5,491,690 A | 2/1996 | Alfonsi |
| 5,497,149 A | 3/1996 | Fast |
| 5,504,491 A | 4/1996 | Chapman |
| 5,506,888 A | 4/1996 | Hayes |
| 5,509,035 A | 4/1996 | Teidemann, Jr. |
| 5,510,797 A | 4/1996 | Abraham |
| 5,513,111 A | 4/1996 | Wortham |
| 5,515,043 A | 5/1996 | Berard |
| 5,519,403 A | 5/1996 | Bickley |
| 5,519,621 A | 5/1996 | Wortham |
| 5,528,232 A | 6/1996 | Verma |
| 5,530,701 A | 6/1996 | Stillman |
| 5,537,458 A | 7/1996 | Suomi |
| 5,539,810 A | 7/1996 | Kennedy, III |
| 5,543,789 A | 8/1996 | Behr |
| 5,544,222 A | 8/1996 | Robinson |
| 5,544,225 A | 8/1996 | Kennedy, III |
| 5,546,445 A | 8/1996 | Dennison |
| 5,550,551 A | 8/1996 | Alesio |
| 5,551,066 A | 8/1996 | Stillman |
| 5,555,286 A | 9/1996 | Tendler |
| 5,555,520 A | 9/1996 | Sudo et al. |
| 5,557,254 A | 9/1996 | Johnson |
| 5,565,858 A | 10/1996 | Guthrie |
| 5,566,173 A | 10/1996 | Steinbrecher |
| 5,572,204 A | 11/1996 | Timm |
| 5,576,716 A | 11/1996 | Sadler |
| 5,587,715 A | 12/1996 | Lewis |
| 5,590,396 A | 12/1996 | Henry |
| 5,594,425 A | 1/1997 | Ladner |
| RE35,498 E | 4/1997 | Barnard |
| 5,619,684 A | 4/1997 | Goodwin |
| 5,621,388 A | 4/1997 | Sherburne |
| 5,625,668 A | 4/1997 | Loomis |
| 5,627,517 A | 5/1997 | Theimer |
| 5,630,206 A | 5/1997 | Urban |
| 5,640,444 A | 6/1997 | O'Sullivan |
| 5,650,770 A | 7/1997 | Schlager |
| 5,663,734 A | 9/1997 | Krasner |
| 5,666,357 A | 9/1997 | Jangi |
| 5,668,803 A | 9/1997 | Tymes |
| 5,673,305 A | 9/1997 | Ross |
| 5,680,439 A | 10/1997 | Aguilera |
| 5,686,910 A | 11/1997 | Timm |
| 5,687,215 A | 11/1997 | Timm |
| 5,687,216 A | 11/1997 | Svensson |
| 5,691,980 A | 11/1997 | Welles |
| 5,703,598 A | 12/1997 | Emmons |
| 5,711,013 A | 1/1998 | Collett |
| 5,712,619 A | 1/1998 | Simkin |
| 5,712,899 A | 1/1998 | Pace, II |
| 5,724,243 A | 3/1998 | Westerlage |
| 5,726,893 A | 3/1998 | Schuchman |
| 5,726,984 A | 3/1998 | Kubler |
| 5,731,757 A | 3/1998 | Layson |
| 5,732,326 A | 3/1998 | Maruyama |
| 5,734,981 A | 3/1998 | Kennedy |
| 5,742,233 A | 4/1998 | Hoffman |
| 5,748,083 A | 5/1998 | Rietkerk |
| 5,748,084 A | 5/1998 | Isikoff |
| 5,751,246 A | 5/1998 | Hertel |
| 5,752,186 A | 5/1998 | Malackowski |
| 5,752,193 A | 5/1998 | Scholefield |
| 5,752,195 A | 5/1998 | Tsuji |
| 5,754,554 A | 5/1998 | Nakahara |
| D395,250 S | 6/1998 | Kabler |
| 5,761,204 A | 6/1998 | Grob |
| 5,761,292 A | 6/1998 | Wagner |
| 5,771,001 A | 6/1998 | Cobb |
| 5,771,455 A | 6/1998 | Kennedy, III |
| 5,774,876 A | 6/1998 | Woolley |
| 5,781,156 A | 7/1998 | Krasner |
| 5,784,422 A | 7/1998 | Heermann |
| 5,786,789 A | 7/1998 | Janky |
| 5,790,842 A | 8/1998 | Charles |

| | | | | | | |
|---|---|---|---|---|---|---|
| 5,794,124 | A | 8/1998 | Ito | 6,067,457 | A | 5/2000 | Erickson |
| 5,796,808 | A | 8/1998 | Scott | 6,069,570 | A | 5/2000 | Herring |
| 5,797,091 | A | 8/1998 | Clisel | 6,070,089 | A | 5/2000 | Brophy |
| 5,804,810 | A | 9/1998 | Wolley | 6,075,458 | A | 6/2000 | Ladner |
| 5,805,576 | A | 9/1998 | Worley, III | 6,076,099 | A | 6/2000 | Chen |
| 5,812,087 | A | 9/1998 | Krasner | 6,081,523 | A | 6/2000 | Merchant |
| 5,812,522 | A | 9/1998 | Lee | 6,091,969 | A | 7/2000 | Brophy |
| 5,815,114 | A | 9/1998 | Speasl | 6,097,760 | A | 8/2000 | Spicer |
| RE35,916 | E | 10/1998 | Dennison | 6,101,395 | A | 8/2000 | Keshavachar |
| 5,825,283 | A | 10/1998 | Camhi | 6,121,922 | A | 9/2000 | Mohan |
| 5,825,327 | A | 10/1998 | Krasner | 6,122,271 | A | 9/2000 | McDonald |
| 5,826,188 | A | 10/1998 | Tayloe | 6,122,514 | A | 9/2000 | Spaur |
| 5,831,574 | A | 11/1998 | Krasner | 6,131,067 | A | 10/2000 | Girerd |
| 5,832,394 | A | 11/1998 | Wortham | 6,131,366 | A | 10/2000 | Fukuda |
| 5,835,907 | A | 11/1998 | Newman | 6,133,874 | A | 10/2000 | Krasner |
| 5,838,237 | A | 11/1998 | Revell | 6,140,956 | A | 10/2000 | Hillman |
| 5,841,396 | A | 11/1998 | Krasner | 6,144,336 | A | 11/2000 | Preston et al. |
| 5,841,842 | A | 11/1998 | Baum | 6,151,493 | A | 11/2000 | Sasakura |
| 5,842,141 | A | 11/1998 | Vaihoja | 6,154,658 | A | 11/2000 | Caci |
| 5,850,392 | A | 12/1998 | Wang | 6,166,688 | A | 12/2000 | Cromer |
| 5,856,986 | A | 1/1999 | Sobey | 6,169,497 | B1 | 1/2001 | Robert |
| 5,864,578 | A | 1/1999 | Yuen | 6,173,194 | B1 | 1/2001 | Vanttila |
| 5,864,763 | A | 1/1999 | Leung | 6,175,307 | B1 | 1/2001 | Peterson |
| 5,870,675 | A | 2/1999 | Tuutijarvi | 6,181,253 | B1 | 1/2001 | Enshenbach |
| 5,874,914 | A | 2/1999 | Krasner | 6,195,736 | B1 | 2/2001 | Lisle |
| 5,881,069 | A | 3/1999 | Cannon | 6,208,959 | B1 | 3/2001 | Jonsson |
| 5,881,373 | A | 3/1999 | Elofsson | 6,212,207 | B1 | 4/2001 | Nicholas |
| 5,884,214 | A | 3/1999 | Krasner | 6,226,529 | B1 | 5/2001 | Bruno |
| 5,886,634 | A | 3/1999 | Muhme | 6,236,652 | B1 | 5/2001 | Preston |
| 5,890,108 | A | 3/1999 | Yeldener | 6,249,227 | B1 | 6/2001 | Brady |
| 5,892,441 | A | 4/1999 | Woolley | 6,266,008 | B1 | 7/2001 | Huston |
| 5,892,454 | A | 4/1999 | Schipper | 6,269,392 | B1 | 7/2001 | Cotichini |
| 5,901,179 | A | 5/1999 | Urabe | 6,272,315 | B1 | 8/2001 | Chang |
| 5,911,129 | A | 6/1999 | Towell | 6,275,990 | B1 | 8/2001 | Dapper |
| 5,912,886 | A | 6/1999 | Takahashi | 6,282,430 | B1 | 8/2001 | Young |
| 5,913,170 | A | 6/1999 | Wortham | 6,288,645 | B1 | 9/2001 | McCall |
| 5,917,449 | A | 6/1999 | Sanderford | 6,295,461 | B1 | 9/2001 | Palmer |
| 5,918,180 | A | 6/1999 | Dimino | 6,300,863 | B1 | 10/2001 | Cotichini |
| 5,930,340 | A | 7/1999 | Bell | 6,300,875 | B1 | 10/2001 | Schafer |
| 5,930,722 | A | 7/1999 | Han | 6,301,480 | B1 | 10/2001 | Kennedy |
| 5,933,468 | A | 8/1999 | Kingdon | 6,304,186 | B1 | 10/2001 | Rabanne |
| 5,936,526 | A | 8/1999 | Klein | 6,304,637 | B1 | 10/2001 | Mirashrafi |
| 5,937,355 | A | 8/1999 | Joong | 6,307,471 | B1 | 10/2001 | Xydis |
| 5,940,598 | A | 8/1999 | Strauss | 6,308,060 | B2 | 10/2001 | Wortham |
| 5,945,944 | A | 8/1999 | Krasner | 6,320,535 | B1 | 11/2001 | Hillman |
| 5,946,304 | A | 8/1999 | Chapman | 6,321,091 | B1 | 11/2001 | Holland |
| 5,946,611 | A | 8/1999 | Dennison | 6,326,736 | B1 | 12/2001 | Kang |
| 5,949,335 | A | 9/1999 | Maynard | 6,327,533 | B1 | 12/2001 | Chou |
| 5,953,694 | A | 9/1999 | Pillekamp | 6,343,217 | B1 | 1/2002 | Borland |
| 5,960,363 | A | 9/1999 | Mizikocsky | 6,345,251 | B1 | 2/2002 | Jansson |
| 5,961,608 | A | 10/1999 | Onosaka | 6,351,495 | B1 | 2/2002 | Tarraf |
| 5,963,130 | A | 10/1999 | Schlager | 6,358,145 | B1 | 3/2002 | Wong |
| 5,963,134 | A | 10/1999 | Bowers | 6,359,923 | B1 | 3/2002 | Agee |
| 5,970,130 | A | 10/1999 | Katko | 6,362,736 | B1 | 3/2002 | Gehlot |
| 5,978,676 | A | 11/1999 | Guridi | 6,373,842 | B1 | 4/2002 | Coverdale |
| 5,991,279 | A | 11/1999 | Haugli | 6,405,033 | B1 | 6/2002 | Kennedy et al. |
| 5,999,124 | A | 12/1999 | Sheynblat | 6,430,176 | B1 | 8/2002 | Christie, IV |
| 5,999,126 | A | 12/1999 | Ito | 6,434,198 | B1 | 8/2002 | Tarraf |
| 6,002,363 | A | 12/1999 | Krasner | 6,466,582 | B2 | 10/2002 | Venters et al. |
| 6,006,189 | A | 12/1999 | Strawczynski | 6,470,046 | B1 | 10/2002 | Scott |
| 6,009,325 | A | 12/1999 | Retzer | 6,477,633 | B1 | 11/2002 | Grimmett |
| 6,009,338 | A | 12/1999 | Iwata | 6,493,338 | B1 | 12/2002 | Preston et al. |
| 6,011,973 | A | 1/2000 | Valentine | 6,516,198 | B1 | 2/2003 | Tendler |
| 6,014,089 | A | 1/2000 | Tracy | 6,519,260 | B1 | 2/2003 | Galyas |
| 6,014,090 | A | 1/2000 | Rosen | 6,522,265 | B1 | 2/2003 | Hillman |
| 6,014,376 | A | 1/2000 | Abreu | 6,526,026 | B1 | 2/2003 | Menon |
| 6,018,654 | A | 1/2000 | Valentine | 6,529,744 | B1 | 3/2003 | Birkler |
| 6,021,163 | A | 2/2000 | Hoshi | 6,611,804 | B1 | 8/2003 | Dorbecker |
| 6,024,142 | A | 2/2000 | Bates | 6,614,349 | B1 | 9/2003 | Proctor |
| 6,031,489 | A | 2/2000 | Wyrwas | 6,617,979 | B2 | 9/2003 | Yoshioka |
| 6,032,037 | A | 2/2000 | Jeffers | 6,628,967 | B1 | 9/2003 | Yue |
| 6,038,310 | A | 3/2000 | Hollywood | 6,665,333 | B2 | 12/2003 | McCrady |
| 6,038,595 | A | 3/2000 | Ortony | 6,677,894 | B2 | 1/2004 | Sheynblat |
| 6,041,124 | A | 3/2000 | Sugita | 6,681,121 | B1 | 1/2004 | Preston |
| 6,044,257 | A | 3/2000 | Boling | 6,683,855 | B1 | 1/2004 | Bordogna |
| 6,046,971 | A | 4/2000 | Ogasawara | 6,690,681 | B1 | 2/2004 | Preston et al. |
| 6,055,434 | A | 4/2000 | Seraj | 6,690,922 | B1 | 2/2004 | Lindemann |
| 6,057,756 | A | 5/2000 | Engellenner | 6,697,987 | B2 | 2/2004 | Lee |
| 6,067,044 | A | 5/2000 | Whelan | 6,700,867 | B2 | 3/2004 | Classon |

| | | | | | | |
|---|---|---|---|---|---|---|
| 6,747,571 | B2 | 6/2004 | Fierro | GB | 2 290 005 A | 5/1994 |
| 6,754,265 | B1 | 6/2004 | Lindemann | JP | 03232349 | 10/1991 |
| 6,771,629 | B1 | 8/2004 | Preston | JP | 5130008 | 5/1993 |
| 6,778,645 | B1 | 8/2004 | Rao | JP | 5252099 | 9/1993 |
| 6,799,050 | B1 | 9/2004 | Krasner | JP | 6077887 | 3/1994 |
| 6,836,515 | B1 | 12/2004 | Kay | JP | 11109062 | 4/1999 |
| 6,845,153 | B2 | 1/2005 | Tiburtius | WO | WO 8912835 | 12/1989 |
| 6,917,449 | B2 | 7/2005 | Nakajima et al. | WO | WO 9107044 | 5/1991 |
| 6,940,809 | B2 | 9/2005 | Sun | WO | WO 9521511 | 8/1995 |
| 6,981,022 | B2 | 12/2005 | Boundy | WO | WO 9607110 | 3/1996 |
| 6,993,362 | B1 | 1/2006 | Aberg | WO | WO 9615636 | 5/1996 |
| 7,092,370 | B2 | 8/2006 | Jiang | WO | WO 9618275 | 6/1996 |
| 7,103,550 | B2 | 9/2006 | Gallagher | WO | WO 9834164 | 8/1998 |
| 7,151,768 | B2 | 12/2006 | Preston | WO | WO 9834359 | 8/1998 |
| 7,164,662 | B2 | 1/2007 | Preston | WO | WO 9853573 | 11/1998 |
| 7,206,305 | B2 | 4/2007 | Preston | WO | WO 9859256 | 12/1998 |
| 7,206,574 | B2 | 4/2007 | Bright | WO | WO 9859257 | 12/1998 |
| 7,215,965 | B2 | 5/2007 | Fournier | WO | WO 99/14885 A2 | 3/1999 |
| 7,221,669 | B2 | 5/2007 | Preston | WO | WO 9956143 | 4/1999 |
| 7,269,188 | B2 | 9/2007 | Smith | WO | WO 9956144 | 4/1999 |
| 7,286,522 | B2 | 10/2007 | Preston | WO | WO 9936795 | 7/1999 |
| 7,317,696 | B2 | 1/2008 | Preston | WO | WO 9949677 | 9/1999 |
| 7,398,100 | B2 | 7/2008 | Harris | WO | WO 0011893 | 3/2000 |
| 7,426,466 | B2 | 9/2008 | Ananthapadmanabhan | WO | WO 0178249 A1 | 10/2001 |
| 7,477,906 | B2 | 1/2009 | Radic | WO | WO 0199295 A2 | 12/2001 |
| 7,483,418 | B2 | 1/2009 | Maurer | WO | WO 02054694 A1 | 7/2002 |
| 7,511,611 | B2 | 3/2009 | Sabino | WO | WO 03034235 A1 | 4/2003 |
| 7,512,098 | B2 | 3/2009 | Jiang | WO | WO 03/081373 A2 | 10/2003 |
| 7,562,393 | B2 | 7/2009 | Buddhikot | WO | WO 2009/149356 A2 | 12/2009 |
| 7,593,449 | B2 | 9/2009 | Shattil | | | |
| 2002/0111167 | A1 | 8/2002 | Nguyen | | | |
| 2002/0122401 | A1 | 9/2002 | Xiang | | | |
| 2003/0016639 | A1 | 1/2003 | Kransmo | | | |
| 2003/0073406 | A1 | 4/2003 | Benjamin | | | |
| 2003/0147401 | A1 | 8/2003 | Kyronaho | | | |
| 2003/0227939 | A1 | 12/2003 | Yukie et al. | | | |
| 2004/0033795 | A1* | 2/2004 | Walsh et al. ............ 455/404.1 | | | |
| 2004/0034529 | A1 | 2/2004 | Hooper, III | | | |
| 2004/0171370 | A1 | 9/2004 | Natarajan | | | |
| 2004/0192345 | A1 | 9/2004 | Osborn | | | |
| 2005/0031097 | A1 | 2/2005 | Rabenko | | | |
| 2005/0090225 | A1 | 4/2005 | Muehleisen | | | |
| 2005/0111563 | A1 | 5/2005 | Tseng | | | |
| 2005/0147057 | A1 | 7/2005 | LaDue | | | |
| 2005/0207511 | A1 | 9/2005 | Madhavan et al. | | | |
| 2005/0215228 | A1 | 9/2005 | Fostick | | | |
| 2005/0226202 | A1 | 10/2005 | Zhang | | | |
| 2006/0025085 | A1* | 2/2006 | Van Bosch et al. ............ 455/99 | | | |
| 2006/0171368 | A1 | 8/2006 | Moinzadeh | | | |
| 2006/0246910 | A1 | 11/2006 | Petermann | | | |
| 2007/0087756 | A1 | 4/2007 | Hoffberg | | | |
| 2007/0124625 | A1 | 5/2007 | Hassan | | | |
| 2007/0258398 | A1 | 11/2007 | Chesnutt | | | |
| 2007/0264964 | A1 | 11/2007 | Birmingham | | | |
| 2008/0025295 | A1 | 1/2008 | Elliott | | | |
| 2008/0056469 | A1 | 3/2008 | Preston | | | |
| 2008/0107094 | A1 | 5/2008 | Borella | | | |
| 2008/0132200 | A1 | 6/2008 | Shinoda | | | |
| 2008/0143497 | A1 | 6/2008 | Wasson et al. | | | |
| 2008/0266064 | A1 | 10/2008 | Curran | | | |
| 2009/0110033 | A1 | 4/2009 | Shattil | | | |
| 2009/0265173 | A1 | 10/2009 | Madhavan | | | |
| 2009/0306976 | A1 | 12/2009 | Joetten | | | |
| 2010/0211660 | A1 | 8/2010 | Kiss | | | |

FOREIGN PATENT DOCUMENTS

| | | |
|---|---|---|
| DE | 44 24 412 A1 | 1/1996 |
| EP | 0 242 099 A2 | 10/1987 |
| EP | 0 528 090 A1 | 8/1991 |
| EP | 0 512 789 A2 | 5/1992 |
| EP | 0 501 058 A2 | 9/1992 |
| EP | 0 545 783 A1 | 11/1992 |
| EP | 054783 | 11/1992 |
| EP | 0 545 753 A1 | 6/1993 |
| EP | 0580 397 A2 | 1/1994 |
| EP | 0889610 A2 | 1/1999 |
| EP | 0 896 442 A1 | 2/1999 |
| EP | 01 950 402 | 12/2004 |
| EP | 1 843 503 A2 | 10/2007 |

OTHER PUBLICATIONS

3rd Generation Partnership Project; Technical Specification Group Services and System Aspects Push Architecture (Rel. 6); 3GPP TR 23.976; vol. 3-SA2, No. V6.1.0; Jun. 1, 2004; pp. 1-34.

International Preliminary Report on Patentability in PCT/US2006/022985 dated Jan. 3, 2008; 6 pages.

PCT/US2009/056834 International Search Report and Written Opinion dated Dec. 30, 2009; 12 pages.

PCT International Search Report dated Nov. 27, 2000 for International Application No. PCT/US00/13288.

Vaha-Sipila, A., URLs for Telephone Calls, Request for Comments: 2806, Network Working Group, Apr. 2000, 16 pages.

Vocal Technologies, Ltd. Home Page, "Audio Codecs," http://www.vocal.com/data_sheets/audio_codecs.html?glad, accessed Jun. 12, 2005.

Werb, Jay and Colin Lanzl, "Designing a Positioning System for Finding Things and People Indoors," IEEE Spectrum, Sep. 1998.

Werb, Jay and Colin Lanzl, "The Next Generation of Control: Local Positioning," abstract, Feb. 1999, vol. 26.

International Search Report and Written Opinion of International Application No. PCT/US07/64443, dated Sep. 15, 2008.

International Search Report for PCT/US06/03416, dated Feb. 5, 2007, 3 pages.

International Search Report PCT/US00/01157; dated May 23, 2000.
International Search Report PCT/US00/13288; dated May 15, 2000.
International Search Report PCT/US01/19845; dated Jun. 22, 2001.
International Search Report PCT/US01/20021, dated Aug. 21, 2001.
International Search Report PCT/US01/27238; dated Aug. 30, 2001.
International Search Report PCT/US02/00996; dated Jun. 24, 2002.

U.S. Appl. No. 60/047,034; dated May 19, 1997; Applicant: Preston.
U.S. Appl. No. 60/047,140; dated May 20, 1997; Applicant: Preston.
U.S. Appl. No. 60/048,369; dated Jun. 3, 1997; Applicant: Preston.
U.S. Appl. No. 60/048,385; dated Jun. 3, 1997; Applicant: Preston.
U.S. Appl. No. 60/055,497; dated Aug. 13, 1997; Applicant: Preston.

"Tracking," published on the Internet at http://www.wisetrack.com/tracking.html, posted May 29, 2002, Copyright 2001 by TVL, Inc.

Office Action in U.S. Appl. No. 09/625,159 dated Apr. 9, 2003; 15 pages.

Office Action in U.S. Appl. No. 09/677,486 dated Oct. 16, 2001; 9 pages.

3GPP2 Access Network Interfaces Technical Specification Group, "3GGP2 Access Network Interfaces TSG (TSG-A) #60, Meeting Summary," Coeur d'Alene, Idaho, Apr. 19, 2004, pp. 1-5.

Bilbao, Alfonso, m-Security (Security and Mobile Telephony), Proceedings of the IEEE 35th Annual 2001, International Carnahan Conference on Security Technology, Oct. 16-19, 2001.

Brian W. Martin, "Watchlt: A Fully Supervised Identification, Location and Tracking System," Proceedings of the IEEE, 29th Annual 1995 International Carnahan Conference on Security Technology, Oct. 1995.

Brown, et al., "A Reconfigurable Modem for Increased Network . . . " IEEE Trans. On Circuits & Systems for Video Technology, vol. 6, No. 2, Apr. 1996, pp. 215-224.

Christ, Thomas W., "A Prison Guard Duress Alarm Location System," Proceedings of the IEEE 1993 International Carnahan Conference on Security Technology: Security Technology, Oct. 13-15, 1993, Copyright 1993 IEEE.

Coleman et al., Subjective Performance Evaluation of the RPE-LTP Codec for the Pan-European Cellular Digital Radio Sys. Nov. 27-30, 1989, pp. 758-761; 1075-1079, IEEE.

Digital Cellular Telecommunications System (Phase 2+); GSM 06.31 version 8.0.1 Release 1999. ETSI EN 300 964 V8.01 (Nov. 2000), pp. 1-13. European Standard (Telecommunications serier). (http://www.etsi.org).

FCC E911 Order, dated Nov. 23, 1998.

Feher, "MODEMS for Emerging Digital Cellular-Mobile Radio System," IEEE Trans. On Vehicular Technology, vol. 40, No. 2, May 1991, pp. 355-365.

Jain et al, Potential Networking Applications of Global Positioning Systems (GPS), downloadable at http://www.cis.ohio-state.edu/~jain/papers/gps.htm, pp. 1-40, Apr. 1996.

Janus Technologies, Inc., "ProxTrak Asset Tracking Interface," copyright 2000 Janus Technologies, Inc., published on the Internet at http://www.janus-tech.com/Products/ProxTrax. html, printed May 29, 2002.

Lavigne, R.E. and P. Eng, "Trunking Versus Conventional Radio System," Proceedings of the IEEE, 34th Annual 2000 International Carnahan Conference on Security Technology, Oct. 23-25, 2000.

Lin, D., et al., "Data Compression of voiceband Modem Signals," 40th IEEE Vehicular Technology Conference: On the Move in the 90's. May 6-9, 1990, pp. 323-325, IEEE, New York, New York.

Lockwood Technology Corporation, "Asset Management," copyright 2002 by Lockwood Technology Corporation, published on the Internet at http://www.lockwoodtechnology.com/ asset_tracking. html, printed May 29, 2002.

McNichols, Shawn, "Keeping Your Assets Safe," published on the Internet at http://www.securitymagazine.com,CDA/ArticleInformation/features/BNP_Features, posted Feb. 14, 2002, Copyright 2001-2002 by Business News Publishing Co.

Mueller, A.J. et al., "A DSP Implemented dual 9600/7200 BPS TCM Modem for Mobile Communications Over FM Voice Radios," Proceedings of the 1997 6th IEEE Pacific rim Conference on Communications, Computers and Signal Processing, vol. 2, Aug. 20-22, 1997, pp. 758-761, IEEE, New York, New York.

Phifer, Lisa A., Surfing the Web Over Wireless, Jan. 1998, http://www.corecom.com/html/ wireless.html, printed May 22, 2007.

Protean Research Group, "Anycast Routing for Mobile Services (ARMS) Project Overview," Published on the Internet at <http://tang.itd.nrl.navy.mll/5522/anycast/anycast_index.html>.

Reut, Anton B., "Remote Monitoring of Military Assets Using Commercial Leo Satellites," IEEE Universal Communications Conference Record, Nov. 6-8, 1995, Copyright 1995 IEEE.

Universal Mobile Telecommunications System (UMTS); Push Architecture (3GPP TR 23.976 version 6.1.0 Release 6); Jun. 2004; 36 pages.

Ayanoglu, E., "Adaptive ARQ/FEC for Multitone Transmission in Wireless Networks" Global Telecommunications Conference, 1995. Conference Record. Communication Theory Mini-Conference, Globecom '95., IEEE Singapore Nov. 13-17, 1995, New York, NY, USA, IEEE, US Lnkd. vol. 3. Whole Document.

Figure 1:
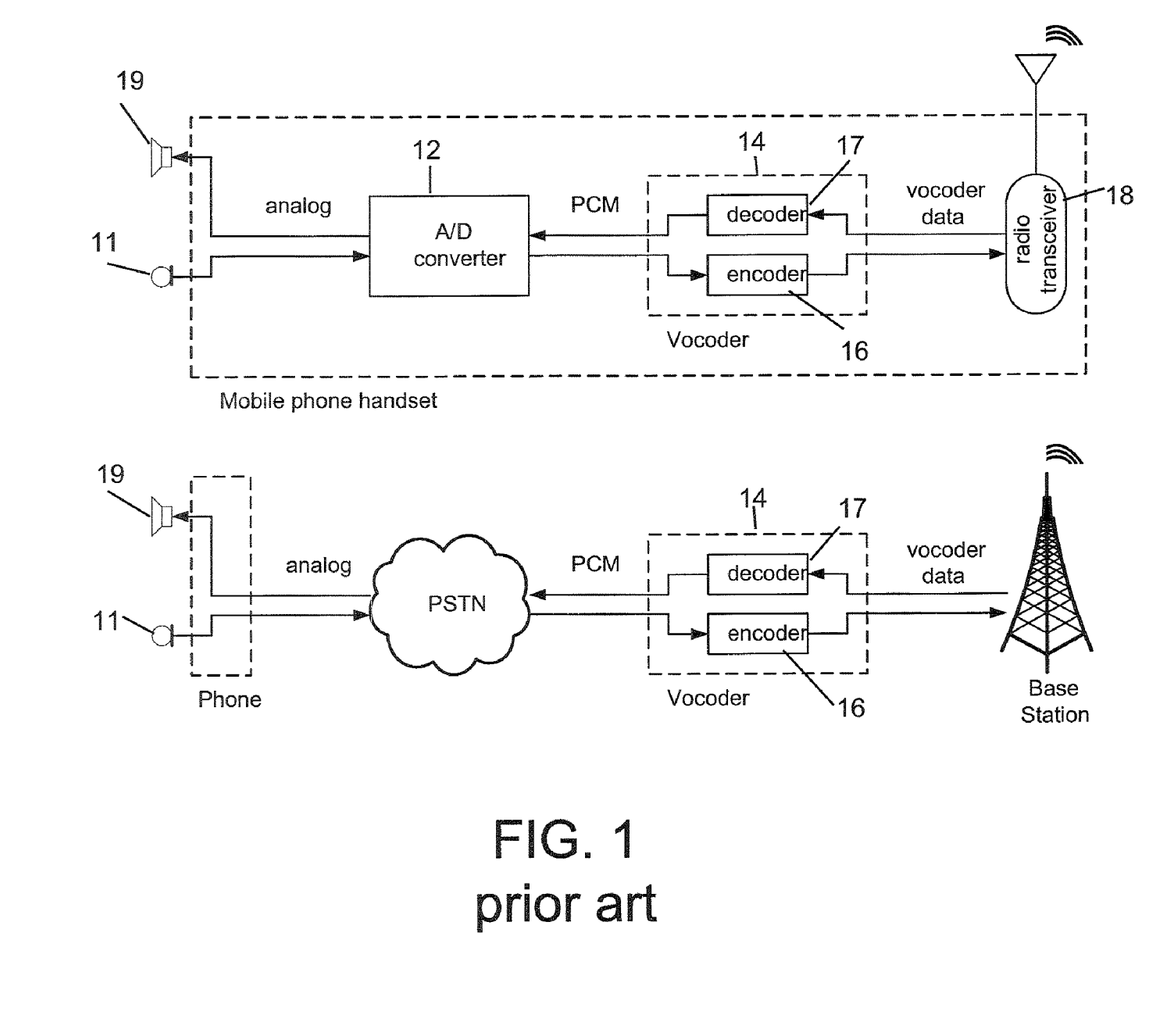
Figure 2:
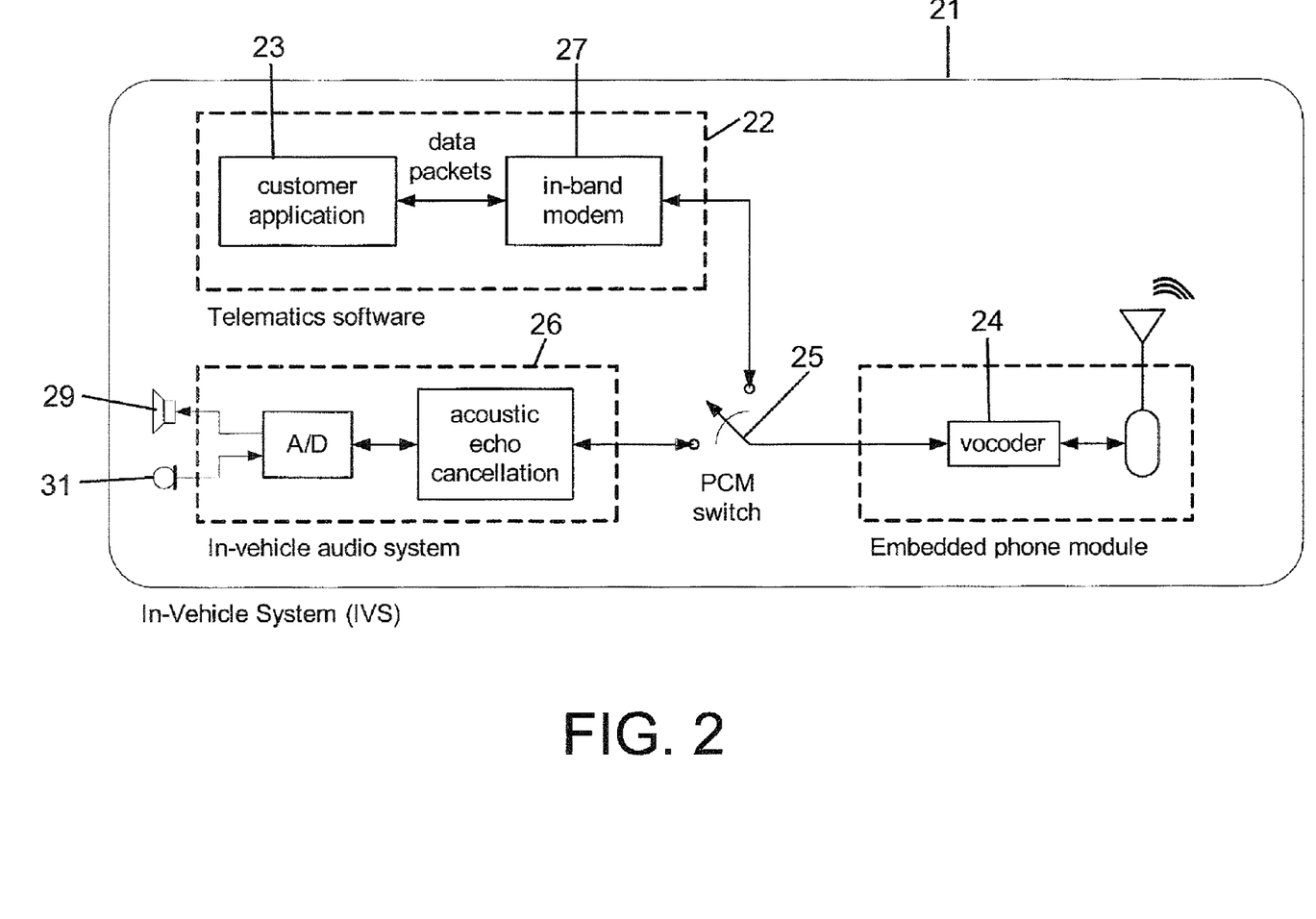

Lemke A. C., et al.: "Voice Over Data and Data Over Voice: Evolution of the Alcatel 1000. Seamless Evolution of the Alcatel 1000 Switching System will Support the Move to Voice and Data Convergence." Electrical Communication, Alcatel. Brussels, BE, Apr. 1, 1999. Abstract; Figure 2.

Benelli G., et al.: "A Coding and Retransmission Protocol for Mobile Radio Data Transmission." Vehicular Technology Conference, 1999. VTC 1999—Fall. IEEE VTS 50th Amsterdam Netherlands Sep. 19-22, 1999. Abstract Section II.

* cited by examiner

WIRELESS IN-BAND SIGNALING WITH IN-VEHICLE SYSTEMS

RELATED APPLICATIONS

This application claims priority from U.S. provisional patent application 60/981,487, filed Oct. 20, 2007.

COPYRIGHT NOTICE

© 2007-2008 Airbiquity Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to methods and apparatus for data communications from vehicles, to obtain emergencies, concierge and other services, using a voice channel of a digital wireless telecommunications network.

BACKGROUND OF THE INVENTION

Wireless telecom coverage has become nearly ubiquitous in much of the world, especially in industrialized countries. However, in many developing countries as well, whole regions that lack traditional copper-wired telecom infrastructure have skipped over that technology to deploy wireless instead. Modern wireless networks provide a range of voice and data services. Technical details of those services can be found in many places, for example, the 3GPP standards group web site www.3gpp.org.

Some wireless data services, however, are slow, and coverage is spotty. Wireless voice services, by contrast, tend to be of good quality and are available almost everywhere people travel. We refer to "in-band" communications as meaning in the voice channel, as distinguished from a data channel, control channel or other non-voice wireless service. Voice channels are characterized by special performance characteristics. For example, only a relatively narrow range of audio frequencies needs to be transceived, based on the normal human voice. In fact, sophisticated compression and coding techniques are known to enable sending and receiving human voice very efficiently over digital wireless networks. However, these voice coders or "vocoders"—typically implemented in software, DSP chips and the like—do not transmit non-voice sounds well at all. To the contrary, they are carefully designed to filter out non-voice signals.

Related information can also be found in U.S. Pat. No. 6,144,336 incorporated herein by this reference. Additional disclosure can be found in U.S. Pat. No. 6,690,681 also incorporated by reference. And finally, further relevant disclosure appears in U.S. Pat. No. 6,493,338 also incorporated by reference as though fully set forth. The foregoing patents are owned by the assignee of the present application.

Additional aspects and advantages of this invention will be apparent from the following detailed description of preferred embodiments, which proceeds with reference to the accompanying drawings.

BRIEF DESCRIPTION OF THE DRAWINGS

FIG. 1 is a simplified block diagram illustrating the typical speech path for a wireless voice call; i.e., a telephone call over the wireless telecommunications network.

FIG. 2 is a simplified block diagram of an illustrative In-Vehicle System (IVS).

FIG. 3 is a diagram illustrating progress over time of an in-band modem detection scheme.

FIG. 4 is a diagram illustrating progress over time of an improved in-band modem detection scheme applying a frequency modulated tone in accordance with one embodiment of the invention.

FIG. 5 is a diagram illustrating progress of a backward-compatible server transmitting both types of initiating signal and listens for both types of response signal. In this way it will be able to identify the IVS modem type.

DESCRIPTION OF PREFERRED EMBODIMENTS

FIG. 1 is a simplified block diagram illustrating the typical speech path for a wireless voice call; i.e., a telephone call over the wireless telecommunications network. Analog voice signals from a microphone 11 are digitized by an A/D converter 12, and then fed to a vocoder 14 encoding algorithm (at 8000 samples/sec). The encoder 16 produces packets of compressed data (typically one packet per 20-ms frame of audio) and feeds this data stream to a radio transmitter of a radio transceiver 18. On the other side, a radio receiver passes the packets to the decoding algorithm 17, which then reconstructs (imperfectly) the original voice signal as a PCM stream. This PCM stream is eventually converted back into an analog voltage which is then applied to a speaker 19.

Using this type of system, modest amounts of data (here we mean user data, not vocoder speech data) can be transmitted "in-band" through careful selection of frequencies, timing, and the use of special techniques that "trick" a vocoder into transmitting information by making that information "look like" human voice data. This type of data communication, using the voice channel of a wireless system, is sometimes called "in-band signaling." It can be implemented in hardware and or software referred to as an "in-band signaling modem," borrowing the old modem term (modulator-demodulator) familiar in traditional "land line" telecommunications.

Several issued patents disclose in-band signaling technology that communicates digital data over a voice channel of a wireless telecommunications network. In one example, an input receives digital data. An encoder converts the digital data into audio tones that synthesize frequency characteristics of human speech. The digital data is also encoded to prevent voice encoding circuitry in the telecommunications network from corrupting the synthesized audio tones representing the digital data. An output then outputs the synthesized audio tones to a voice channel of a digital wireless telecommunications network. In some cases, the data carrying "tones" are sent along with simultaneous voice. The tones can be made short and relatively unobtrusive. In other implementations, sometimes called "blank and burst," the voice is cut off while data is transmitted through the voice channel. In still other implementations, portions of the audio frequency spectrum are used for voice, while other portions are reserved for data. This aides in decoding at the receiving side.

In-band signaling requires appropriate facilities (e.g. an in-band modem) at both ends of the call. A challenge arises in detecting when to turn the modem on and off. That is, once a call is connected (link established), when should the receiving system switch from voice mode of operation (using microphone and speaker typically), to a data mode in which it works to recover data from the audio (voice) channel? Preferably, this should be done automatically, i.e., without human intervention. Prior art control signaling in a wireless network employs a control channel, which is not in-band. Unlike the voice channel, control channel signaling may be proprietary to the carrier and therefore not available to all client systems.

One application of this technology, used for illustration in this document, is communications with a motor vehicle. Today, many vehicles have some capability for communications over a wireless networks. We refer to these vehicle systems as a telematics client system. FIG. 2 is a simplified block diagram of an illustrative In-Vehicle System (IVS) 21. It shows an example of the relevant portion of a typical telematics client system. This client system consists of embedded hardware and software designed to operate in an automobile environment.

In FIG. 2, the telematics software 22 includes a "customer application," 23 which may be almost any application, in particular one that employs data transfer via the wireless network. For example, the customer application may relate to navigation or entertainment. In operation, the customer application conveys data (preferably data packets) to an in-band signaling modem 27. The in-band modem 27 converts the data (along with packet headers and other overhead as appropriate) into audio frequency tones, which are presented at the "PCM Switch" 25.

One purpose of the client system (IVS) 21 is to transfer telematics data between a vehicle and a server over the same wireless voice call that the occupant uses to communicate with a human operator. Sometimes the server is located at a "call taker center" where human operators may be available, similar to an emergency 911 call taker center. Here, the system must have a switch that disconnects the in-vehicle audio system 26 at the beginning of an in-band modem session. If the switching decision is to be controlled from the server side, then the in-band signaling must be used to indicate when a modem session should begin.

Referring again to FIG. 2, in this embodiment the PCM switch 25 is controlled by an in-band "modem detection" scheme. There are two ways to make a mistake: false detection (the speaker 29 is muted when it shouldn't be), and missed detection (the speaker 29 isn't muted when it should be muted). Both kinds of errors should be as infrequent as possible, yet it presents a challenge to avoid them. One important advantage of the present invention is improved detection performance.

Figure 3:
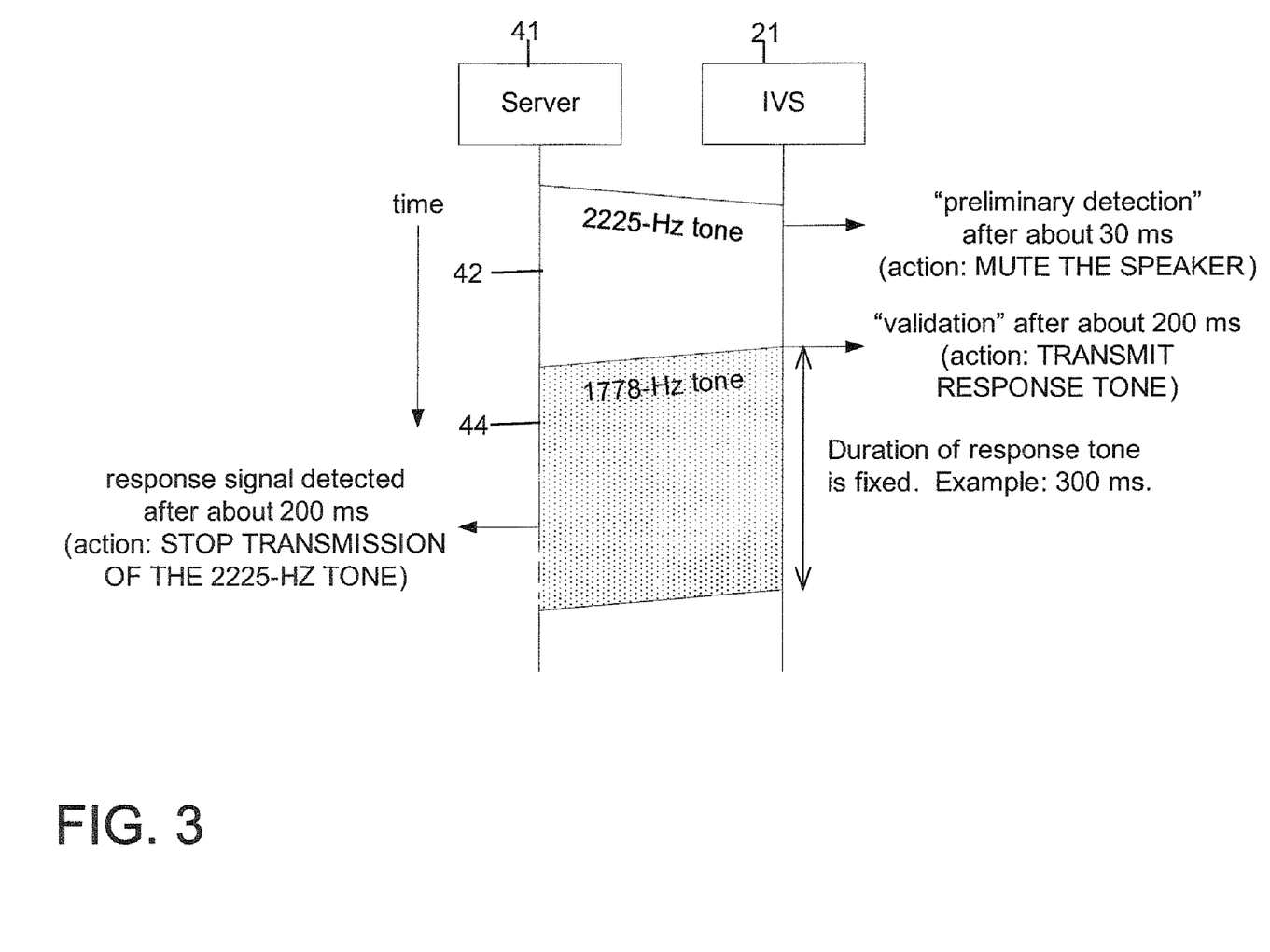

FIG. 3 illustrates a progression over time of a first in-band modem detection scheme. The given tone frequencies shown in the drawing are only examples. In operation, the server 41 (located at a call taker center, or "data center" which may be automated (unattended)), transmits a predetermined audio frequency tone 42, for example 2225 Hz, which has been selected to traverse the current vocoder technology. This is the signal to the vehicle system to interrupt the voice conversation and begin an in-band modem session.

After detecting this frequency tone 42 at the IVS side, for at least a predetermined threshold period of time, say about 30 msec, a "preliminary detection" is deemed accomplished, and the IVS 21 will mute the speaker 31 (FIG. 2) in the vehicle. (In this way, the vehicle occupants will not hear the "noise" of data transferring in the form of audio frequency tones 42.) If the selected "signaling tone" is detected for a longer than a predetermined threshold period of time, "Validation" is deemed to have occurred, and a "Response" is sent from the IVS 21 to the server 41. Accordingly, the IVS 21 will switch the PCM switch 25 in FIG. 2 to couple the in-band modem 27 to the vocoder 24 in the embedded phone module for data transmission (in the voice channel) to the data center.

The "Response" tone 44 has a second selected frequency, namely 1778 Hz in the illustrative example. It also has a selected duration, namely 300 msec in the illustrative example. This is the signal that the IVS 21 is ready to begin the in-band modem session. If the server 41 detects this signal for at least a predetermined threshold period of time, say about 200 msec then it (the server 41) stops transmission of the initiating tone 42.

The foregoing strategy is useful for many applications, but a further problem arises with changes in wireless technology. One area of frequent improvement is in the vocoders mentioned above. As vocoders become more efficient at coding human voice, it sometimes becomes even more difficult to transmit data through the voice channel where those vocoders are used. The in-band control signaling scheme described above may work fine for some vocoders, but not other, newer models.

One might address this problem by studying the characteristics of the new vocoder, and then attempting to design a control signaling scheme that is compatible with the new vocoder. Even if that succeeds, however, there are many vehicles in use that still operate the older "legacy modem." It is essential for a successful communication system that it operates properly with both older IVS's (having legacy modems) as well as newer ones that employ newer vocoders. The need remains to interact properly with two or more different in-band modems as may be deployed in various vehicles (or other portable applications, for example handheld personal communication devices). The "preliminary detection" tone at 2225 Hz for example, described above, may work with an older vocoder but gets filtered out in a newer model. At best, the IVS would not mute the speaker within the desired time. At worst, the in-band data communication system would fail.

The problem of backward and forward compatibility between a data server and various mobile units is not limited to the control signaling. The actual data transfers through some vocoders may require the use of frequencies quite different from those compatible with legacy vocoders. For example, with some legacy vocoders, 2100 Hz (downlink) and 2500 Hz (uplink) are useful frequencies for encoding data. For other vocoders, lower frequencies such as 1200 Hz and 1600 Hz may be preferred.

Thus it is essential for the server system to "discover" or detect the type of remote vocoder in use on a particular call, not only for control signaling, but also so that it can encode data appropriately to survive the remote vocoder. Moreover, it is important that the server very quickly discover type of remote vocoder in use, for example in less than two seconds, so that it can send an appropriate control signal directing the IVS to mute the speaker in the vehicle, before distracting data tones are heard. (In general, the incoming telephone number used to contact the call center cannot be used to distinguish the remote modem in use because a single telephone number preferably is used for all IVS systems of a given vehicle manufacturer.)

Figure 4:
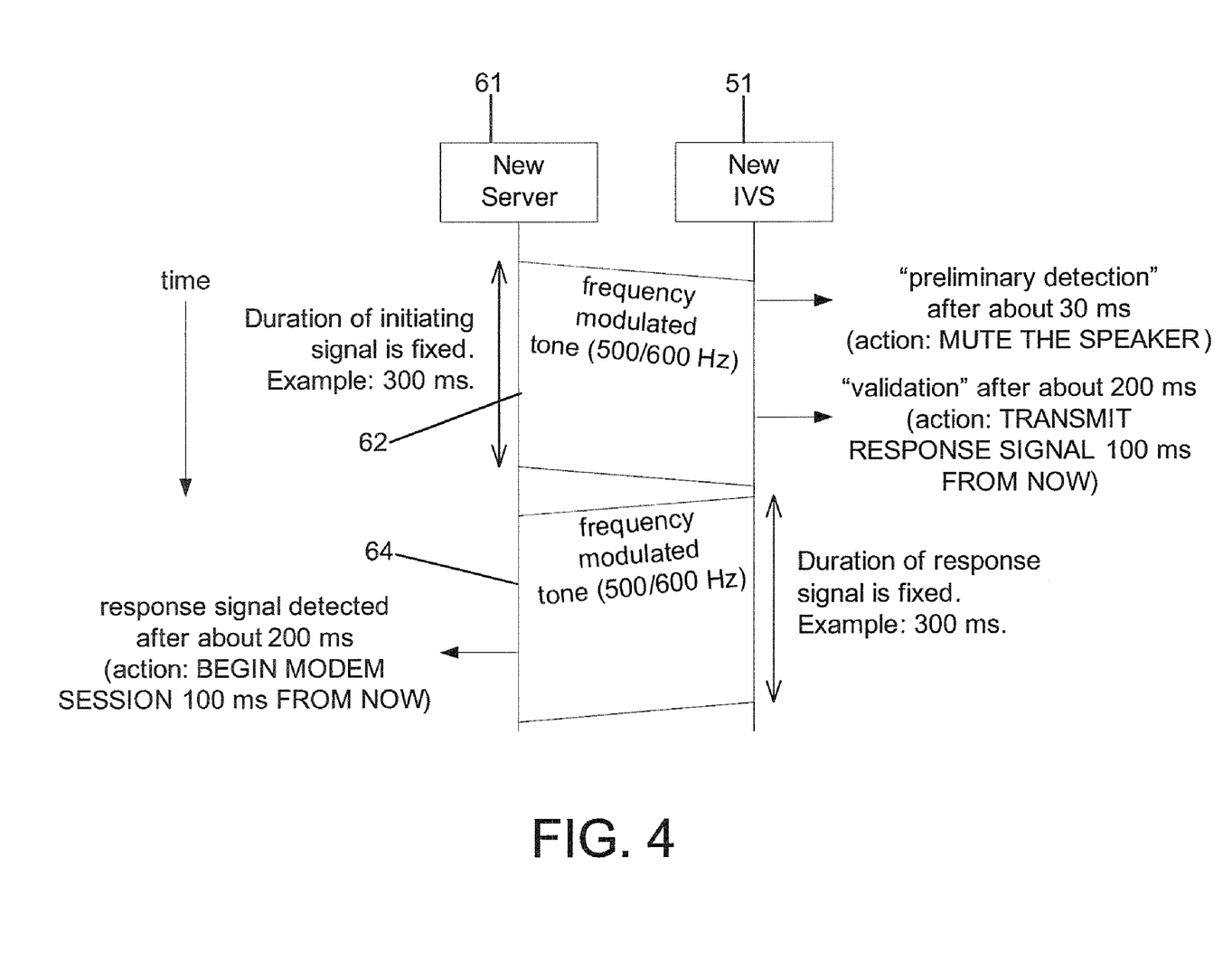

Refer to FIG. 4. For illustration, let us assume that a 2225-Hz tone is effective as a control signal over an older vocoder channel, but that it is unreliable over a newer vocoder. In accordance with another aspect of the present invention, a frequency modulated (FM) tone 62 is transmitted by the server 61 to elicit the response tone 64, the FM signal oscillating between 500 and 600 Hz. It might switch frequency, for example, every 20 or 40 msec; this describes the order of magnitude, the exact values are not critical. The frequency modulation is a key aspect in preventing false detections during regular voice conversation.

Figure 5:
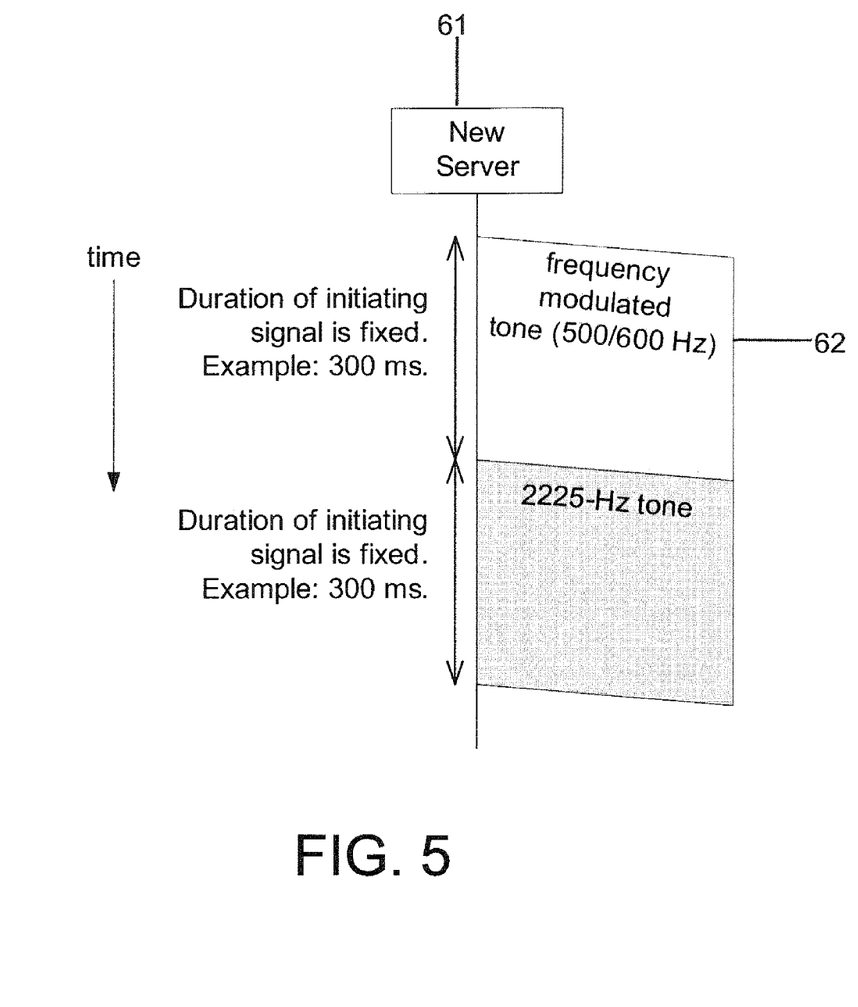

Refer next to FIG. 5: If the server 61 must be backward compatible with legacy IVS modems, then it could alternate between the new initiating 62 signal and the old one 42 (FIG. 2) while listening for both types of response signals 64 and 44.

It will be apparent to those having skill in the art that many changes may be made to the details of the above-described embodiments without departing from the underlying principles of the invention. The scope of the present invention should, therefore, be determined only by the following claims.

The invention claimed is:

1. A method comprising the steps of:
providing an In-Vehicle System (IVS) including an in-band signaling modem in a vehicle for mobile, wireless voice and data communication, both the voice and data communications to occur over a single voice call via a voice channel of a digital wireless communication network;
the vehicle further including an in-vehicle audio system for entertainment and communication uses;
the in-vehicle audio system including a speaker and microphone;
deploying a customer application in the IVS, the customer application coupled to the in-band signaling modem for sending data via the in-band signaling modem during a voice call;
in the IVS, initiating the voice call via the digital wireless communication network to a remote call taker location;
at the call taker location, receiving the voice call initiated from the IVS;
sending a predetermined signaling tone from the call taker location, via the voice call, to the IVS preparatory to an in-band data session; and
in the IVS, responsive to receiving the predetermined signaling tone, muting the audio system speaker so that occupants of the vehicle will not hear the sounds of data transferring in the form of audio frequency tones between the customer application and the call taker location.

2. The method according to claim 1 and further comprising:
measuring a duration of the signaling tone;
muting the speaker only after the signaling tone duration exceeds a first predetermined threshold period of time.

3. The method according to claim 2 and further comprising:
if and when the signaling tone duration exceeds a second predetermined threshold period of time longer than the first predetermined threshold period of time, transmitting a predetermined response signal to the call taker location to acknowledge the signaling tone.

4. The method according to claim 2 and further comprising:
responsive to receiving the signaling tone, and during the same voice call, commencing an in-band data session for sending data from the IVS to the call taker location via the voice channel of the digital wireless communication network.

5. The method according to claim 4 and further comprising:
transmitting a frequency-modulated tone from the call taker location to the IVS as the signaling tone for backward compatibility with older in-band modems.

6. The method according to claim 5 wherein the frequency-modulated tone alternates among a plurality of selected audio frequencies, the audio frequencies selected for compatibility with known vocoders, so that the signaling tone passes through the vocoders.

7. The method according to claim 6 wherein the frequency-modulated tone alternates between two selected audio frequencies.

8. The method according to claim 5 wherein the frequency-modulated tone switches among selected audio frequencies at a selected period having an order of magnitude of approximately 20 msec to 40 msec.

9. The method according to claim 5 including, in the IVS, sending a response signal in response to recognizing any of the selected audio frequencies used for the signaling tone.

10. The method according to claim 4 including automatically beginning the in-band data session after a predetermined setup period that begins when a response signal is detected at the remote location.

11. The method according to claim 4 wherein the call taker location is unattended.

12. The method according to claim 3 wherein the response signal is an audio tone having a predetermined duration.

13. The method according to claim 12 wherein the response signal predetermined duration is on the order of 300 msec.

14. The method according to claim 4 wherein the customer application sends location data in the data session via the in-band modem for the call taker location to initiate emergency services.

15. An In-Vehicle System (IVS) comprising:
machine-readable memory for storing telematics software;
a processor for reading the machine-readable memory and executing the telematics software stored therein;
the telematics software configured for execution on the processor for sending and receiving data via a voice channel of a digital wireless communication network;
the telematics software including a customer application and an in-band signaling modem for encoding and decoding data sent from and to the customer application;
an in-vehicle audio system, the audio system including a speaker and a microphone;
an embedded phone module, the phone module configured for at least voice-channel communications via the digital wireless communication network;
a switch for controllably coupling the in-vehicle audio system to the embedded phone module for voice communications, or alternatively coupling the in-band signaling modem to the embedded phone module for data communication, all during a single voice channel wireless call; and
the switch arranged to interrupt a voice conversation, by coupling the in-band signaling modem to the embedded phone module to begin an in-band data session, and muting the speaker of the in-vehicle audio system, in response to detecting a predetermined signal tone received via the embedded phone module during a voice-channel call;
wherein the predetermined signal tone has approximately a predetermined audio frequency.

16. The IVS according to claim 15 wherein the signal tone has at least a first predetermined threshold duration before the switch activates to mute the audio system.

17. The IVS according to claim 16 wherein the predetermined audio frequency is approximately 2225 Hz.

18. The IVS according to claim 16 wherein the first predetermined threshold duration is on the order of 30 msec.

19. The IVS according to claim 16 wherein the in-band modem sends a predetermined response signal via the embedded phone module, during the same voice-channel call, if and when the received signal tone exceeds a second threshold duration longer than the first predetermined threshold duration.

20. The IVS according to claim 19 wherein the second threshold duration is on the order of 300 msec.

* * * * *